United States Patent [19]

Duffell

[11] Patent Number: 5,788,439
[45] Date of Patent: Aug. 4, 1998

[54] RAILCAR LOAD DIVIDER DOOR SUSPENSION DEVICE

[76] Inventor: Joseph D. Duffell, P.O. Box 3186, Hutchinson, Kans. 67504-3186

[21] Appl. No.: 648,348

[22] Filed: May 15, 1996

[51] Int. Cl.⁶ ............................................. B60P 7/14
[52] U.S. Cl. .................. 410/138; 410/145; 410/139; 410/137; 410/133
[58] Field of Search ..................... 410/130, 132–135, 410/137–139, 145–148, 150; 105/355; 220/534, 542, 550; 296/37.6; 52/243.1, 64

[56] References Cited

U.S. PATENT DOCUMENTS

| | | | |
|---|---|---|---|
| 3,191,546 | 6/1965 | Adler | 410/137 |
| 3,298,143 | 1/1967 | Rogers et al. | 52/64 |
| 3,467,028 | 9/1969 | James | 410/138 |
| 4,049,311 | 9/1977 | Dietrich et al. | 410/134 X |
| 4,372,716 | 2/1983 | Blout | 410/138 X |
| 5,090,171 | 2/1992 | Kano et al. | 52/243.1 |
| 5,104,269 | 4/1992 | Hardison | 410/145 X |
| 5,193,319 | 3/1993 | Claassen et al. | 52/243.1 |
| 5,329,858 | 7/1994 | Morris et al. | 410/130 X |
| 5,338,137 | 8/1994 | Jensen | 410/146 |
| 5,386,674 | 2/1995 | Sfirakis et al. | 410/134 X |

*Primary Examiner*—Stephen T. Gordon
*Attorney, Agent, or Firm*—Kenneth H. Jack

[57] ABSTRACT

A railcar load divider support carriage having a load divider support beam, a pair of roller support bars fixedly attached to opposing ends of the load divider support beam, the ends of the roller support bars extending horizontally from the sidewalls of the load divider support beam, and a pair of rollers rotatably mounted at the ends of each of the roller support bars, the roller carriage providing for rolling motion of a railcar load divider door along roller tracks affixed to the interior of a railcar, the roller tracks engaging with and supporting the rollers.

7 Claims, 5 Drawing Sheets

RAILCAR LOAD DIVIDER DOOR SUSPENSION DEVICE

FIELD OF THE INVENTION

This invention relates to an improved carriage for suspending, supporting, and carrying railcar load divider doors.

PRIOR ART PATENTS

U.S. Pat. No. 4,049,311 issued Sep. 20, 1977, to Dietrich, et al., discloses a load divider door and roller carriage for use in semi-truck trailers.

U.S. Pat. No. 5,193,319 issued Mar. 16, 1993, to Claassen, et al., discloses an overhead rolling room partition.

U.S. Pat. No. 5,090,171 issued Feb. 25, 1992, to Kano, et al., discloses a mechanism relating to a movable partitioning panel.

U.S. Pat. No. 3,298,143 issued Jan. 17, 1967, to Rogers et al., discloses a mechanism for rollable suspension of a wall.

U.S. Pat. No. 3,191,546 issued Jun. 29, 1965, to Adler discloses a rollable railcar bulkhead door carriage.

U.S. Pat. No. 5,386,674 issued Feb. 7, 1995, to Sfirakis, et al., discloses a railcar bulkhead door.

None of the patents above listed disclose or teach the useful, novel, and inventive aspects of the present invention.

BACKGROUND OF THE INVENTION

Railcars have long utilized load divider doors which form a complete partition or wall dividing the interior space of the railcar into at least two segregated chambers. The load divider doors typically are movable along the length of the railcar by rolling along overhead roller tracks, and may be fixed in place by a lock mechanism at any point along the length of the railcar for purposes of segregating cargo within the railcar and for prevention of shifting and movement of cargo.

Such load divider doors typically are suspended from roller tracks affixed to the sidewalls of the railcar near the top of the walls, each track extending the full length of the railcar. Typically, a carriage for suspending a load divider door spans between the roller tracks, with the door affixed to and hanging downward from the carriage.

The most common carriage and roller track configuration is a cogwheel carriage which comprises a steel cylindrical shaft having a cogged wheel affixed to either end. The tracks have a multiplicity of cog receiving apertures spaced and fitted for receiving the cogs of the cogwheels. When the cogwheel carriage is in placed upon the roller tracks, the cogs of the cogwheels at either end of the shaft rest within and are secured in place by the cog receiving apertures of the tracks. Between the cogwheels, the cylindrical shaft passes through and is rotatably mounted within a closely fitted cylindrical sleeve, the sleeve having eye and device attachments at either end providing a means of attaching a load divider door. This known configuration of a door carriage and roller track allows a railcar load divider door to be pushed or pulled along the length of a railcar, causing the cogwheels at either end of the cylindrical shaft to roll along the apertured roller tracks. The engagement of the cogs of the cogwheels with the apertures of the tracks maintains the carriage in perpendicular alignment with the sidewalls of the railcars.

The known apertured track and cogwheel carriage configuration has several less than desireable traits. For example, with use over time, the engagement of the cogs of the cogwheels with the apertures of the track causes both the tracks and the cogwheels to prematurely wear out, necessitating frequent premature replacement of both the tracks and the cogwheels. Also, cogwheel carriages have a tendency to jam. If the cogwheels become misaligned upon the opposing apertured tracks, the carriage becomes fixed in place, requiring the entire load divider door and carriage assembly to be lifted and realigned before rolling movement of the door can take place. Also, the apertured track and cogwheel assembly imposes a high initial resistance to rolling, making it difficult for a railyard worker to move the load divider door from one position to another.

A further disadvantage of the known cogwheel carriage configuration is that such carriages are not adjustable in length to accommodate for variances in the distance between the roller tracks of various railcars.

Thus, it is an object of the present invention to provide an improved railcar load divider door carriage which overcomes the above-mentioned disadvantages. More specifically, it is an object of the present invention to provide:

1. A railcar load divider door carriage which provides for consistent perpendicular alignment of the load divider door with the sidewalls of the railcar by means of a door support beam spanning the distance between the overhead roller tracks of a railcar, the beam having paired perpendicularly spaced rollers affixed and supported at either end of the beam, each roller having an annular flange for securing the rollers upon the overhead roller tracks, and the spacing of the rollers apart from each other being sufficient to prevent the carriage and load divider door suspended therefrom from rotating out of perpendicular alignment with the sidewalls of the railcar.

2. A door carriage as aforesaid wherein the point of engagement between the flanged rollers and the overhead tracks imposes a small amount of friction, providing for lessened wear and tear, and eliminating the need for frequent replacement of roller track and carriage assemblies.

3. A door carriage, as aforesaid, wherein the engagement of the overhead roller tracks with the rollers provides low resistance to rolling motion of the carriage and load divider door suspended therefrom, allowing the door to be easily moved from one position to another within the railcar.

4. A door carriage as aforesaid providing a means of adjustment of its overall length, allowing the carriage to be closely fitted to span and rest upon the roller tracks of any particular railcar.

5. A door carriage as aforesaid wherein the rollers have internal sealed bearings providing for a long useful life, and eliminating the need for frequent replacement.

6. A door carriage as aforesaid having angular metal keepers fixedly attached thereto for preventing the carriage from bouncing or vibrating upward off of overhead tracks suspending the carriage.

Other objects and purposes of the invention will be apparent to persons familiar with railcar load dividers doors and carriages upon reading the following specifications and inspecting the accompanying drawings.

DETAILED DESCRIPTION

Figure 1:
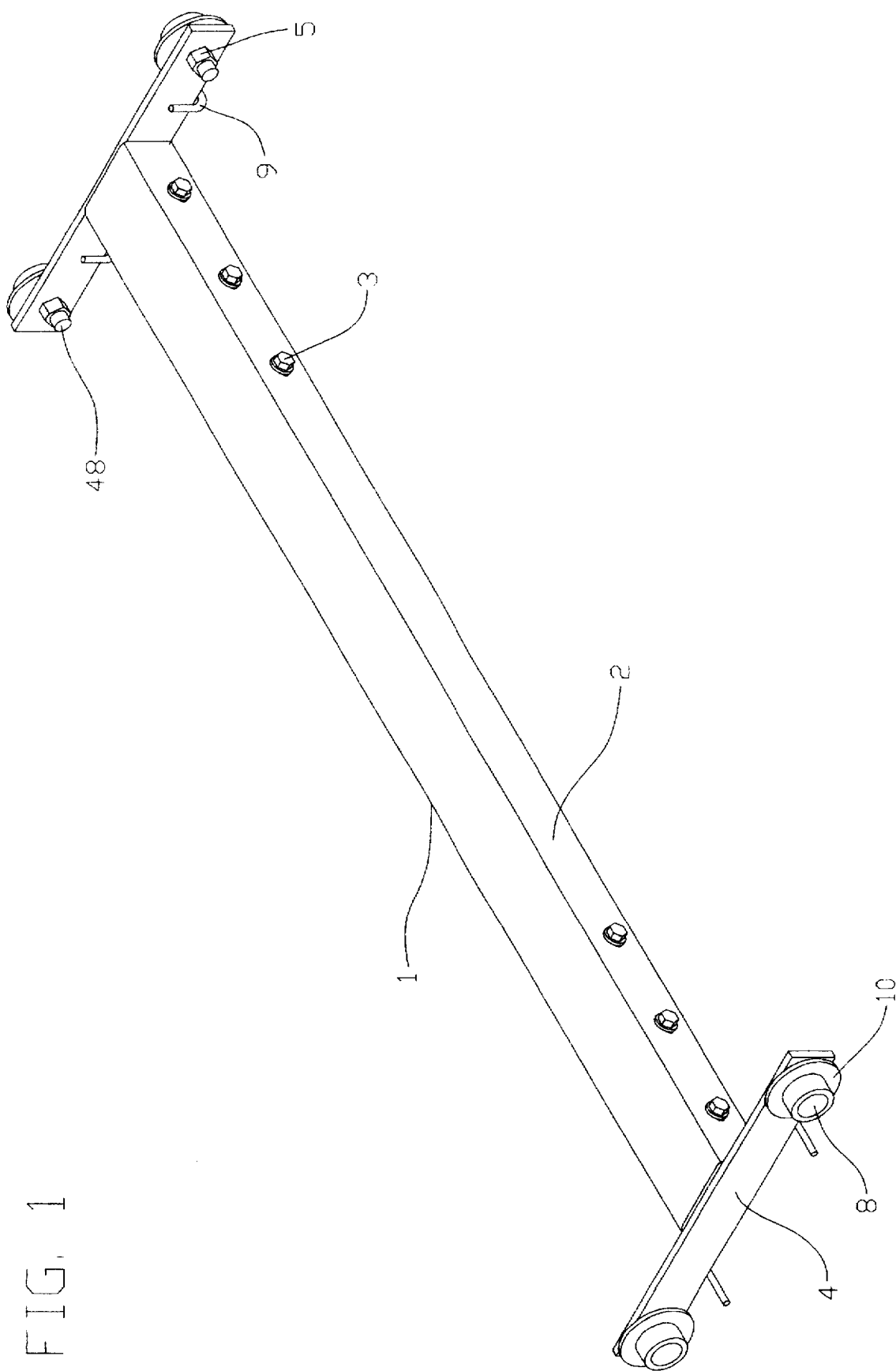
FIG. 1 is a perspective view of the door carriage viewed from above.

Referring to FIG. 1 depicting the door carriage 1 in perspective view, a door support beam 2 which is a length of channel steel is provided to substantially span the distance between the overhead roller tracks of a railcar. As shown in FIG. 1, the channel steel beam 2 is oriented so that it is concave downward. At either end of the door support beam 2 are affixed roller support bars 4, each roller support bar 4 having rotatably mounted thereupon a pair of rollers 8, each roller having an annular flange 10 for securing the rollers 8 and door carriage in position upon roller tracks.

Figure 2:
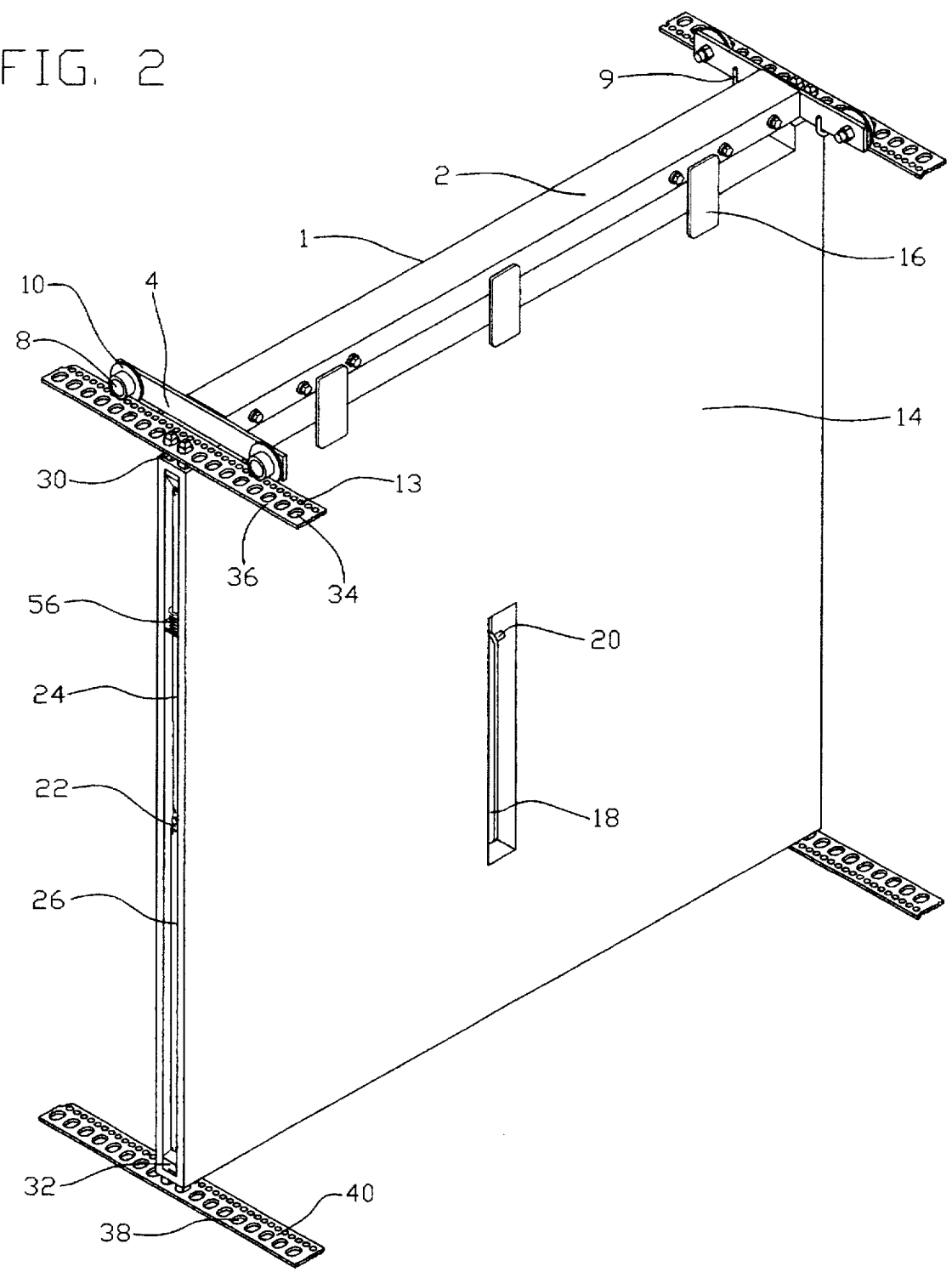
FIG. 2 is a perspective view of the door carriage viewed from above, showing tracks and a suspended load divider door.

Referring to FIG. 2, the door carriage 1 rests upon overhead roller tracks 36, and has a load divider door 14 suspended from the door support beam 2, typically by means of metal connector plates 16 welded to the upper end of the load divider door 14 and to the sidewalls of the door support beam 2. Metal keepers 9 are welded to the interior surfaces of the roller support bars 4, the keepers 9 extending vertically downward and thence horizontally outward to underlie the overhead roller tracks 36. The metal keepers 9 prevent the door carriage from bouncing upward away from the overhead roller tracks 36.

Figure 4:
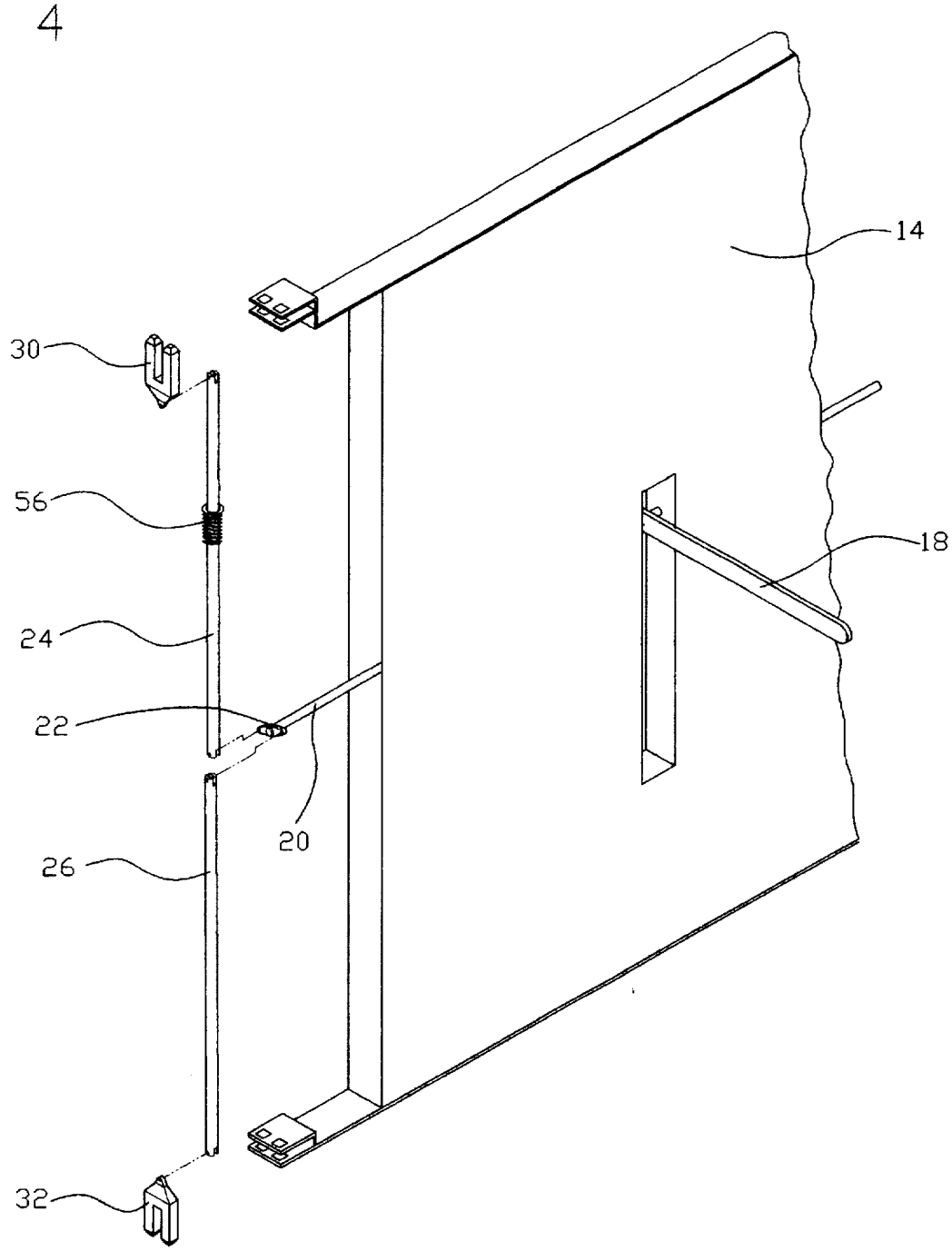
FIG. 4 is an exploded view of a load divider door latching mechanism.

In operation, to latch the load divider door 14 in place, the door release lever 18 may be positioned vertically downward as portrayed in FIG. 2, causing, (referring to the exploded view of FIG. 4), a bolt biasing shaft 20 to rotate and causing "T" bars 22 affixed to either end of the bolt biasing shaft 20 to rotate. The rotation of the bolt biasing shaft 20 caused by pivoting the lever 18 downward causes an upper bolt extension shaft 24 to extend upward, and causes a lower bolt extension shafts 26 to extend downward. Upward and downward extension of the upper and lower bolt extensions shafts 24 and 26 respectively cause the upper bolts 30 and the lower bolts 32 to extend upward and downward. Referring to FIG. 2, the upper and lower bolts 30 and 32 extend respectively through upper bolt receiving apertures 34 of the upper roller tracks 36 and through lower bolt receiving apertures 38 of lower bolt receiving tracks 40, the lower bolt receiving tracks being affixed to the floor of the railcar. The extensions of the upper and lower bolts 30 and 32 through bolt receiving apertures 34 and 38, lock the load divider door 14 in place. Referring to FIG. 4, a biasing spring 56 assists in maintaining the upper and lower bolts 30 and 32 in their extended positions.

In order to move a load divider door 14 from a locked position to a new position within a railcar, the door release lever 18 is pivoted upward causing the upper and lower bolts 30 and 32 to retract from and clear the bolt receiving apertures 34 and 38, and allowing the door carriage 1 and load divider door 14 to freely roll along the upper roller tracks 36 the length of the railcar. Upon repositioning the load divider door 14, the door release lever 18 is pivoted downward causing the upper and lower bolts 30 and 32 to extend and engage with bolt receiving apertures 34 and 38, locking the load divider door 14 in its new position.

Figure 3:
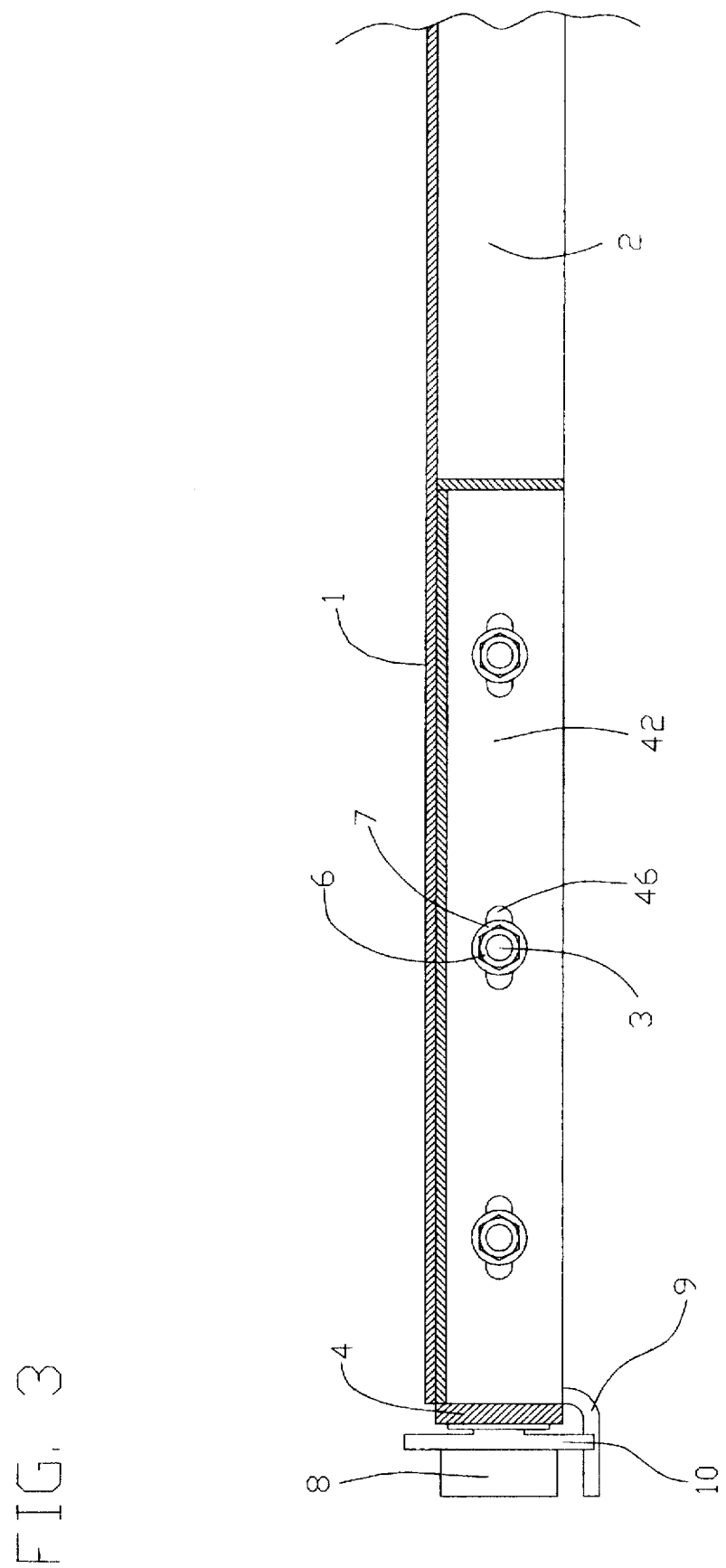
FIG. 3 is a cutaway view of a portion of the door carriage, the section line cutting through the longitudinal mid-line of the door carriage.

Referring to FIG. 3, the length of the door carriage 1 is adjustable by means of an adjustment beam 42, which, like the door support beam 2, is a length of channel steel which is fitted to nest within the concave space of the door support beam 2, the concave space of the adjustment beam 42 facing downward. An end of the adjustment beam 42 is welded to the roller support bar 4, allowing the adjustment beam 42, when nested within the concave space of the door support beam 2, to be slidably positioned variable distances outward from the end of the door support beam 2.

Each sidewall of the door support beam 2 has a series of circular bolt receiving apertures which are positioned to overlie and align with a series of bolt receiving slots 46 within and through the sidewalls of the adjustment beam 42. Referring to FIG. 1, threaded bolts 3 pass through the bolt receiving apertures and through the bolt receiving slots 46, the threaded bolts 3 being secured by means of threaded nuts 6 which tighten against flat washers 7. With threaded bolts 3 in place through the bolt receiving apertures and the bolt receiving slots 46, the adjustment beam 42 may be positioned within the channel of the door support beam 2 to adjust its overall length. Upon reaching the desired length, threaded nuts 6 are tightened upon the threaded bolts 3, causing the adjustment beam 42 to be fixed in place. The opposite end of the door carriage 1 not shown in FIG. 3 is a mirror image of the portion shown in FIG. 3.

Figure 5:
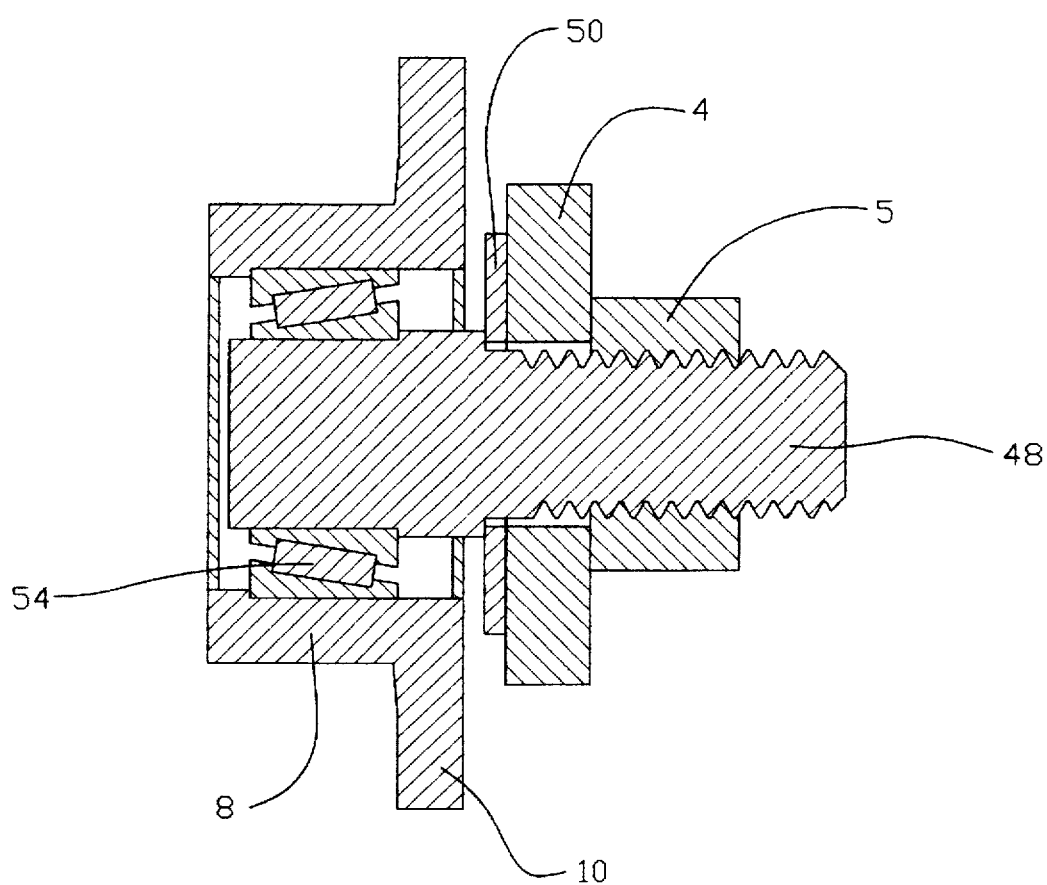
FIG. 5 is a cutaway view of a sealed bearing roller.

Referring FIG. 5, each of the rollers 8 revolve about a roller shaft 48, the roller shaft passing first through a circular washer 50, then through a circular aperture within and through the roller support bar 4, and then through a threaded nut 5. Tightening of the threaded nut 5 on the threaded portion of the roller shaft 48, secures the roller 8 in place. Rolling friction between the roller 8 and the roller shaft 48 is minimized by internally sealed ring bearings 54. The rollers 8 preferably are heavy duty, providing for an extended useful life.

In operation, the roller carriage 1, as described above, provides for smooth and efficient rolling motion of a load divider door 14 within a railcar and, referring to FIG. 2, the carriage may be installed upon roller tracks 36 which have cogwheel apertures 13 adapted for use with cogwheel carriages, or may be installed upon roller tracks having no such apertures.

Although a particular preferred embodiment of the invention has been disclosed above for illustrative purposes, it will be understood that variations or modifications thereof which lie within the scope of the appended claims are fully contemplated.

I claim:

1. A support carriage comprising:
   (A) A load divider support beam having a first end and having a second end;
   (B) A first roller support bar;
   (C) A second roller support bar;
   (D) A first pair of rollers;
   (E) A second pair of rollers;
   (F) Adjustable mounting means; the adjustable mounting means being capable of fixedly and adjustable attaching the first roller support bar upon the load divider support beam so that the first roller support bar is positioned at a point outwardly removed from the first end of the load divider support beam and so that the ends of the first roller support bar extend perpendicularly from a line extending alone the longitudinal midline of the load divider support beam, the adjustable mounting means attaching the first roller support bar to the load divider support beam; the second roller support bar being fixedly attached to the second end of the load divider support beam so that the ends of the second roller support bar extend perpendicularly outward from said line; the first pair of rollers being rotatable mounted upon the first roller support bar so that their axes of rotation are substantially parallel with said longitudinal midline; the second pair of rollers being rotatable mounted upon the second roller support bar so that their axes of rotation are substantially parallel with said longitudinal midline; and (G) A plurality of load divider suspension plates, the load divider suspension plates being fixedly welded to the exterior surface of the load divider support beam; the load divider support beam comprising a first upper wall and a pair of first sidewalls, such walls forming an adjustment beam receiving channel; the adjustable mounting means comprising an adjustment beam fixedly and adjustable mounted within the adjustment beam receiving channel; the adjustment beam comprising a second upper wall and a pair of second sidewalls; the first sidewalls of the load divider support beam having a plurality of first bolt receiving apertures therethrough; the second sidewalls of the adjustment beam having a plurality of second bolt receiving apertures therethrough, the second bolt receiving apertures being positioned upon the second sidewalls so that upon slidable mounting of the adjustment beam within the adjustment beam receiving channel of the load divider support beam, the second bolt receiving apertures may align with the first bolt receiving apertures; the adjustable mounting means further comprising a plurality of bolts extending through the first bolt receiving apertures, and thence through the second bolt receiving apertures; the second bolt receiving apertures being elongated slots; each of the rollers comprising the first and second pair of rollers having an annular flange therearound; each of such rollers having sealed internal bearings.

2. A support carriage providing rolling suspension of a railcar load divider door from roller tracks affixed along the rooflines of the interior space of a railcar, the support carriage comprising:

(A) A load divider support beam having a first end, a second end, an upper wall, and a pair of sidewalls, the walls forming an interior channel;

(B) A first roller support bar having an interior surface and an exterior surface, the interior surface being fixedly attached to the first end of the load divider support beam and positioned so that the first roller support bar is in perpendicular alignment with the longitudinal axis of the load divider support beam and so that the ends of the first roller support bar protrude horizontally from the exterior surfaces of the sidewalls of the load divider support beam;

(C) A second roller support bar having an interior surface and an exterior surface, the interior surface of the second roller support bar being fixedly attached to the second end of the load divider support beam and positioned so that the second roller support bar is in perpendicular alignment with the longitudinal axis of the load divider support beam, so that the second roller support bar is in parallel alignment with the first roller support bar, and so that the ends of the second roller support bar protrude horizontally from the exterior surfaces of the sidewalls of the load divider support beam;

(D) A first pair of rollers rotatable mounted at opposite ends of the first roller support bar and positioned so that their axes of rotation are in parallel alignment with the longitudinal axis of the load divider support beam, and so that the first pair of rollers protrude outwardly from the exterior surface of the first roller support bar;

(E) A second pair of rollers rotatably mounted at opposite ends of the second roller support bar and positioned so that their axes of rotation are in parallel alignment with the longitudinal axis of the load divider support beam, and so that the second pair of rollers protrude outwardly from the exterior surface of the second roller support bar;

(F) A first adjustment beam having an upper wall, a pair of sidewalls, a first end, and a second end, the first end of the first adjustment beam being fixedly attached to the interior surface of the first roller support bar in perpendicular alignment therewith, the exterior width of the first adjustment beam being closely fitted to the width of the interior channel of the load divider support beam;

(G) A second adjustment beam having an upper wall, a pair of sidewalls, a first end, and a second end, the first end of the second adjustment beam being fixedly attached to the interior surface of the second roller support bar in perpendicular alignment therewith, the exterior width of the second adjustment beam being closely fitted to the width of the interior channel of the load divider support beam; the sidewalls of the load divider support beam having a plurality of support beam apertures therethrough along the longitudinal length thereof; the sidewalls of the first and second adjustment beams having a plurality of adjustment beam apertures along the longitudinal length thereof, the adjustment beam apertures being positioned so that upon placement of the first and second adjustment beams within the interior channel of the load divider support beam, the first and second adjustment beams may be slidably positioned along the length of the interior channel to cause a plurality of the adjustment beam apertures to align with and underlie a plurality of support beam apertures, forming continuous passages from the exterior surfaces of the sidewalls of the load divider support beam to the interior surfaces of the sidewalls of the first and second adjustment beams; and the means of fixed attachment of the first and second roller support bars to the ends of the load divider support beam comprising a plurality of threaded bolts positioned within and through the continuous passages, the threaded bolts being secured in place by threaded nuts; and (H) A plurality of load divider door suspension plates, the load divider door suspension plates being fixedly welded to the sidewalls of the load divider support beam.

3. The support carriage described in claim No. 2 wherein the support beam apertures are elongated slots whose longitudinal axes are in parallel alignment with the longitudinal axis of the load divider support beam, and whose vertical axes are closely fitted for receiving the shafts of the threaded bolts.

4. The support carriage described in claim No. 2 wherein the adjustment beam apertures are elongated slots whose longitudinal axes are in parallel alignment with the longitudinal axes of the first and second adjustment beams, and whose vertical axes are closely fitted for receiving the shafts of the threaded bolts.

5. The support carriage described in claim No. 2 wherein each of the rollers comprising the first and second pair of rollers have an annular flange extending from their exterior radial surfaces for retaining the rollers upon the roller tracks of the railcar, and for maintaining the load divider support beam in perpendicular alignment with the sidewalls of the railcar.

6. The support carriage described in claim No. 5 wherein each of the rollers making up the first and second pair of rollers have sealed internal bearings.

7. The support carriage described in claim No. 6 further comprising a plurality of cylindrical angled keepers fixedly attached to the support carriage and positioned to extend outward therefrom and to underlie the roller tracks to prevent the support carriage from bouncing or vibrating upward away from the roller tracks.

* * * * *